A. A. ROSENGREN.
CAR COUPLING MECHANISM.
APPLICATION FILED MAR. 11, 1910.

1,001,890.

Patented Aug. 29, 1911.

2 SHEETS—SHEET 1.

Witnesses:

Inventor:
Anders Andersson Rosengren his Attorneys

A. A. ROSENGREN.
CAR COUPLING MECHANISM.
APPLICATION FILED MAR. 11, 1910.
1,001,890.
Patented Aug. 29, 1911.
2 SHEETS—SHEET 2.
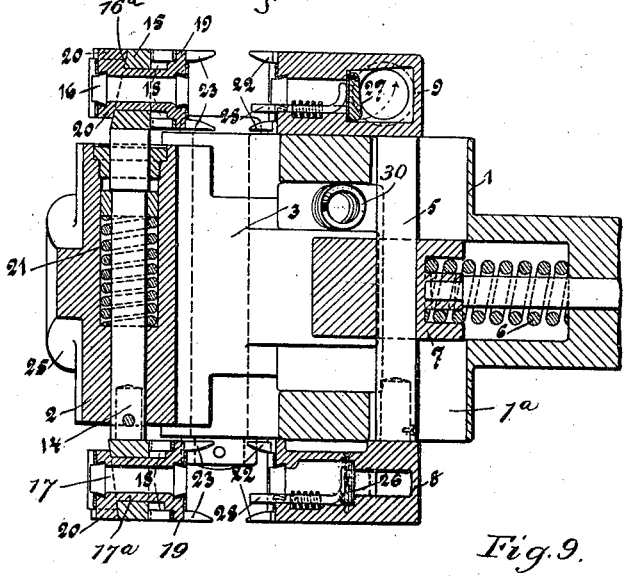
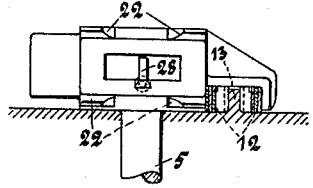
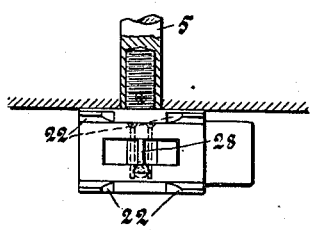
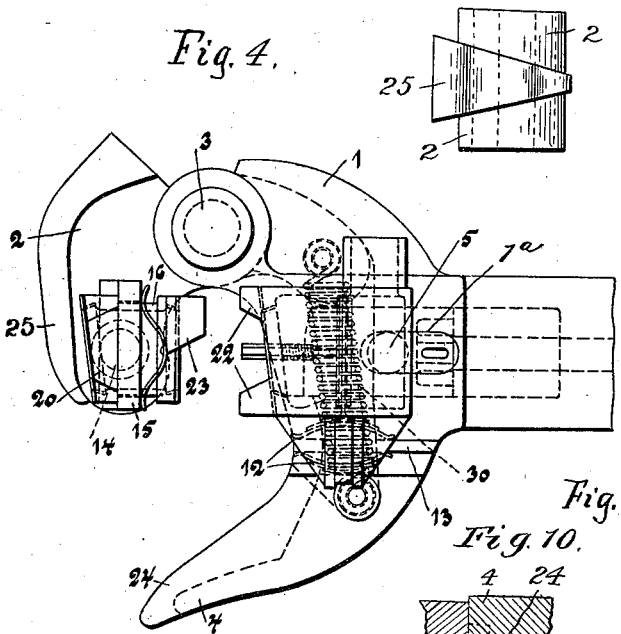
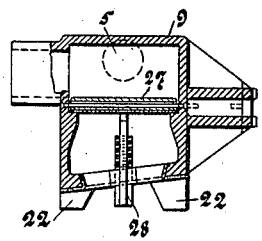
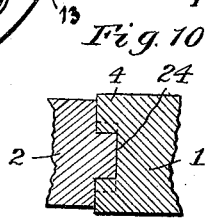
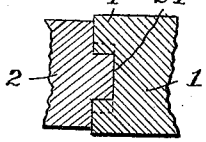
Witnesses:—
Isabel F. Munk.
Edw. S. Lieckner.
Inventor
Anders Andersson Rosengren
by
his Attorney

UNITED STATES PATENT OFFICE.

ANDERS ANDERSSON ROSENGREN, OF MALMÖ, SWEDEN.

CAR-COUPLING MECHANISM.

1,001,890.  Specification of Letters Patent.  Patented Aug. 29, 1911.

Application filed March 11, 1910. Serial No. 548,737.

*To all whom it may concern:*

Be it known that I, ANDERS ANDERSSON ROSENGREN, a subject of the King of Sweden, and resident of Malmö, Sweden, have invented certain new and useful Improvements in Car-Coupling Mechanism, of which the following is a specification.

My invention relates to automatic car coupling mechanism, and includes means whereby, when cars are coupled, the air brake pipes and the pipes employed for the heating medium, such as steam, are coupled at the same time.

The object of my invention is to provide a simple structure which will operate efficiently to automatically couple up, during the train coupling operation, the air brake pipes and the pipes through which the heating medium circulates.

My invention is illustratively exemplified in the accompanying drawing, wherein—

Figure 1:
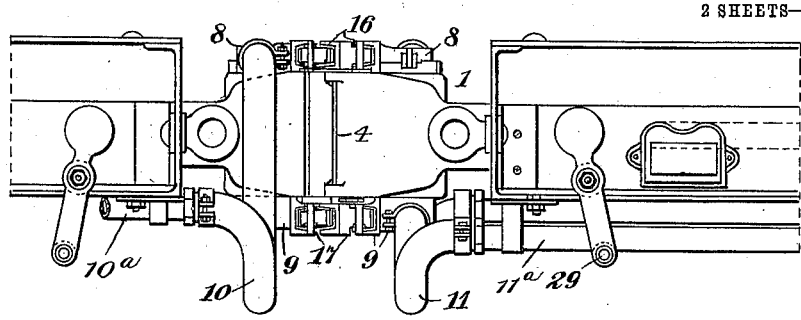
Figure 2:
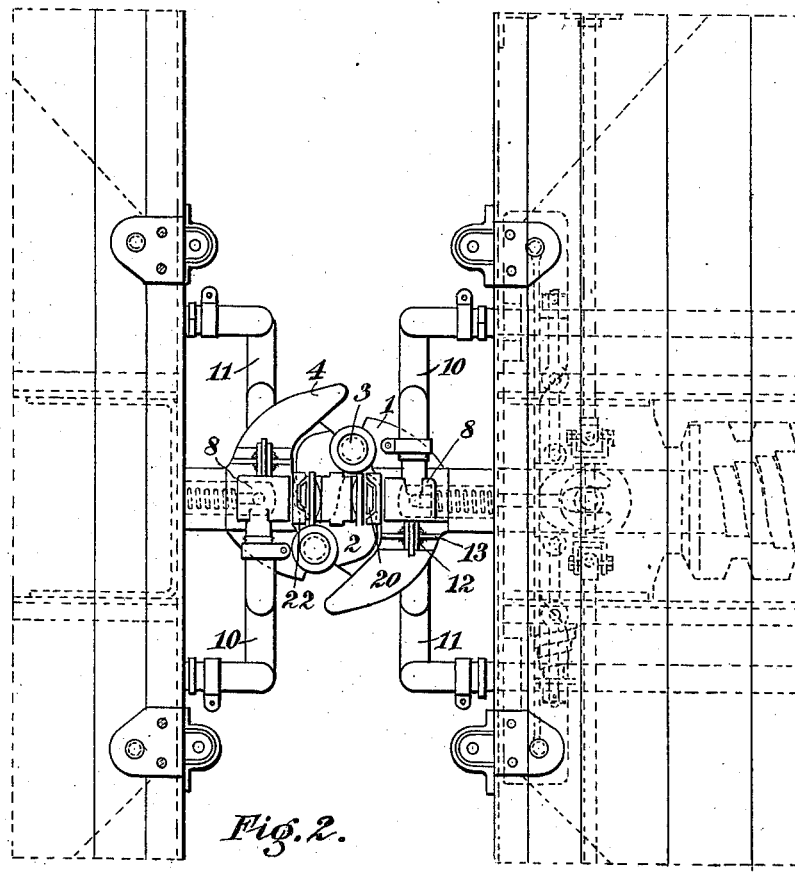

Figure 1 is a side elevational view of the device showing the parts coupled in operative position; Fig. 2 is a top plan view thereof in like position; Fig. 3 is a vertical sectional view, on an enlarged scale, of a coupling head provided with my improvements, Fig. 4 is a top plan view thereof; Fig. 5 is a detail elevational view of one valved ported casing carried by the steam pipe on the train; Fig. 6 is a similar view of the casing carried by the air brake pipe; Fig. 7 is a horizontal sectional view of the casing shown in Fig. 5; Fig. 8 is a similar view of the casing shown in Fig. 6; Figs. 9 and 10 are detail views illustrative of the manner in which the ridge or elevation 25 on the knuckle engages the groove 24 of the horn formed on the coupling head.

In carrying my invention into practice I connect the air brake pipe and the heating pipe through the medium of sections of hose, with ported valved casings, and I also provide the pivoted coupling knuckle with casings having through ports, and when cars are coupled up, the ports in the knuckle are brought into registry with the ports in the coupling head thus forming continuous through conduits for the compressed air and heating medium.

Referring in detail, and by reference numerals, to the accompanying drawings, 1 designates the usual form of coupling head fixed to one end of the car. Each head 1 has a horn extension 4 and has pivoted thereto at 3 the coupling knuckle 2. Adapted to reciprocate in a slot 1ª in the head 1 is a bolt 5 which is engaged by a bolt 7 under the influence of a spring 6, the bolt 7 serving to lock the pivoted jaw 2. Threaded to each end of the bolt 5 and reciprocable with the latter are ported casings 8 and 9, connected through hose sections 10 and 11, respectively, with the air brake pipe 10ª and the steam or hot air pipe 11ª both running the length of the car under which they are carried. Formed on the head 1 at one side of the casings 8 and 9 are ridges or ribs 13 against which springs 12 bear, the latter also bearing against the casings 8 and 9 to keep the latter in proper position during the coupling operations.

Each pivoted knuckle 2 is traversed by a longitudinal bolt 14 carrying at each end a frame member 15, said frame member serving to hold the casings 16ª and 17ª which are formed with the through ports 16 and 17 adapted under certain conditions to register and communicate with the ports 8 and 9 at each side thereof. Each casing 16ª and 17ª is formed with a flange 19 and arranged in an undercut part of these casings are springs 18 which tend to force lugs 20 formed on the casings into intimate contact with their retaining frames 15. The said bolts 14 are encircled by coiled springs 21, one end of the spring acting against the knuckle 2 and the other end thereof exerting pressure on the bolt, the said springs tending to hold the casings 16ª and 17ª in the required relative position to the casings 8 and 9.

To insure proper juxtaposition of the casings 8 and 9, and 16ª and 17ª during coupling of cars, these casings are each provided with beveled projections 22 and 23, so that when the projections meet the casings will be guided and forced into proper alinement with each other. In order also to compensate for inequalities of plane of cars during coupling, owing to difference in load and the like, I provide on each knuckle a ridge or elevation 25 which corresponds in shape with a groove 24 formed in the horn 4, and when the cars are coupled the ridge and groove will coöperate to insure the safety of the coupling.

For the purpose of preventing escape of compressed air and steam through the casings 8 and 9, the latter are provided with valves 26 and 27, respectively, each provided with a stem 28 extending beyond the valve casing. These valves are normally closed and are opened by inward pressure upon the stems by parts of the casings 16ª and 17ª when cars are coupled.

The operation of the invention will be clear from the following description thereof:—Prior to coupling the ports occupy the several positions indicated in Figs. 3 and 4 of the drawings. When the cars come together for coupling the knuckle 2 swings on its pivot, its ridge 25 riding in and engaging the groove 24 in the horn 4. Two adjacent ports 16 are then brought into alinement whereby adjacent ports 8 are connected, the valve stems 28 being forced inwardly to open the valves 26. Adjacent ports 17 are also brought into alinement thus also connecting the adjacent ports 9, the valves 27 being forced inwardly to open communication throughout the length of pipe for the heating medium. When the cars are coupled the coupling appears as shown in Figs. 1 and 2. After uncoupling the ports reassume the position shown in Figs. 3 and 4, the bolts 7 being retracted by the lever 29 and the springs 30 operating to swing the knuckle 2 outwardly.

Having thus described my invention what I claim as new and desire to secure by Letters Patent is:—

1. In car coupling mechanism of the character specified, the combination with the coupler head and knuckle pivoted thereto, of a ported casing carried by said head and being in communication with the fluid train pipe system, and a casing open at both ends carried by the knuckle whereby when the cars are coupled a continuous conduit is formed.

2. In a car coupling mechanism of the character specified, the combination with the coupler head and knuckle pivoted thereto, of ported casings carried by said head and being in communication, respectively, with the air brake and heating pipes of the cars, and casings open at both ends and movably mounted on the knuckle, whereby when the cars are coupled the open casings of the knuckle are alined with the ported casings of the coupler heads to form continuous conduits for the passage of compressed air and heating medium.

3. In car coupling mechanism of the character specified, the combination with the coupler head and knuckle pivoted thereto, of a bolt yieldingly reciprocable in said head and provided at each end thereof with ported casings communicating respectively with the compressed air pipe and the heating medium pipe, and additional casings open at both ends carried by the knuckle whereby when cars are coupled the said several casings will be juxtaposed to form continuous conduits for the passage of compressed air and heating medium.

4. In car coupling mechanism of the character specified, the combination with the coupler head and knuckle pivoted thereto, of a bolt yieldingly reciprocable in said head and carrying a ported casing at each end communicating respectively with the compressed air pipe and heating medium pipe, of a second bolt passing through the pivoted knuckle and carrying at each end a casing open at both ends adapted to register with the ported casings in the coupler head and a spring encircling said last mentioned bolt and adapted to keep the casings carried thereby in position.

5. In car coupling mechanism of the character specified, the combination with the coupler head and knuckle pivoted thereto, of a bolt passing through the head and having yielding reciprocal movement therein, a ported casing carried at each end of said bolt and being in communication respectively with the compressed air pipe and the heating medium pipe, a second bolt passing through the pivoted knuckle and having a casing open at both ends at each end thereof adapted upon coupling of cars to register with the ports in the first named casings, a spring encircling said second named bolt and adapted to keep the casings carried thereby in position, and springs acting between said second named bolt and the casings carried thereby.

6. In car coupling mechanism of the character specified, the combination with the coupler head including a horn extension having a groove formed therein, of a knuckle pivoted to said head and having a ridge formed thereon conforming to the shape of the groove in the head, ported casings carried by the head and communicating respectively with the compressed air pipe and the heating medium pipe, additional casings open at both ends carried by the said knuckle and means for alining the said several casings during coupling of cars, said means comprising beveled projections extending outwardly from said casings.

In witness whereof I have hereunto set my hand in presence of two witnesses.

ANDERS ANDERSSON ROSENGREN.

Witnesses:
M. C. W. TRULM,
E. HIDENSKY.